United States Patent [19]

Connell

[11] Patent Number: 5,575,309

[45] Date of Patent: Nov. 19, 1996

[54] SOLENOID ACTUATOR

[75] Inventor: Richard A. Connell, Cambridge, United Kingdom

[73] Assignee: BLP Components Limited, Newmarket, United Kingdom

[21] Appl. No.: 338,560

[22] PCT Filed: Mar. 31, 1994

[86] PCT No.: PCT/GB94/00691

§ 371 Date: Nov. 21, 1994

§ 102(e) Date: Nov. 21, 1994

[87] PCT Pub. No.: WO94/23230

PCT Pub. Date: Oct. 13, 1994

[30] Foreign Application Priority Data

Apr. 3, 1993 [GB] United Kingdom ............... 9306980

[51] Int. Cl.[6] .................................................. F16K 31/08
[52] U.S. Cl. ........................... 137/556; 137/554; 251/77; 251/129.15; 251/129.2; 251/129.22
[58] Field of Search ................. 251/77, 129.2, 251/129.15, 129.01, 129.22; 137/554, 556

[56] References Cited

U.S. PATENT DOCUMENTS

| 2,922,614 | 1/1960 | Nickells | 251/129.22 X |
|---|---|---|---|
| 3,604,480 | 9/1971 | Reichert | 251/129.22 X |
| 4,299,252 | 11/1981 | Reinicke | 251/129.15 X |
| 4,341,241 | 7/1982 | Baker | 137/554 |
| 4,930,747 | 6/1990 | Nakamura | 251/129.15 X |
| 5,137,055 | 8/1992 | Matsushima et al. | 251/30.04 X |
| 5,211,372 | 5/1993 | Smith, Jr. | 251/129.22 X |

FOREIGN PATENT DOCUMENTS 2140129  11/1984  United Kingdom.

Primary Examiner—Kevin Lee
Attorney, Agent, or Firm—Iandiorio & Teska

[57] ABSTRACT

A solenoid actuator for a fluid flow valve comprises a closure member (64) adapted to engage a fluid flow orifice (16), and includes a magnetic plunger (46) under the control of a solenoid, for moving the closure member (64) into or out of engagement with the orifice (16). To assist the opening of the valve, a diaphragm spring (66) aids the downward force upon plunger (46) at changeover, being deflected during the upward stroke of plunger (46) and held deflected until changeover.

The solenoid plunger (46) is stable at either end of its travel to maintain the selected state of the valve, change of state to open or close orifice (16) being by means of an magnetic pulse generated by solenoid coil (43), the plunger (46) being latched at closure by permanent magnets (32,34).

The diaphragm spring (66) may form part of an assembly (62) including a membrane switch (70), responsive to the state of the valve, the assembly (62) fitting into the body of the closure member (64). Alternatively a reed switch responsive to magnetic flux may provide valve status indication.

The use of a diaphragm spring to assist in valve opening, enables provision of an axially more compact, and electromagnetically more efficient actuator, able with appropriate intrinsic safety protection, to be enclosed within a gas meter housing to control an incoming gas supply under control of electronic switching circuits.

9 Claims, 4 Drawing Sheets

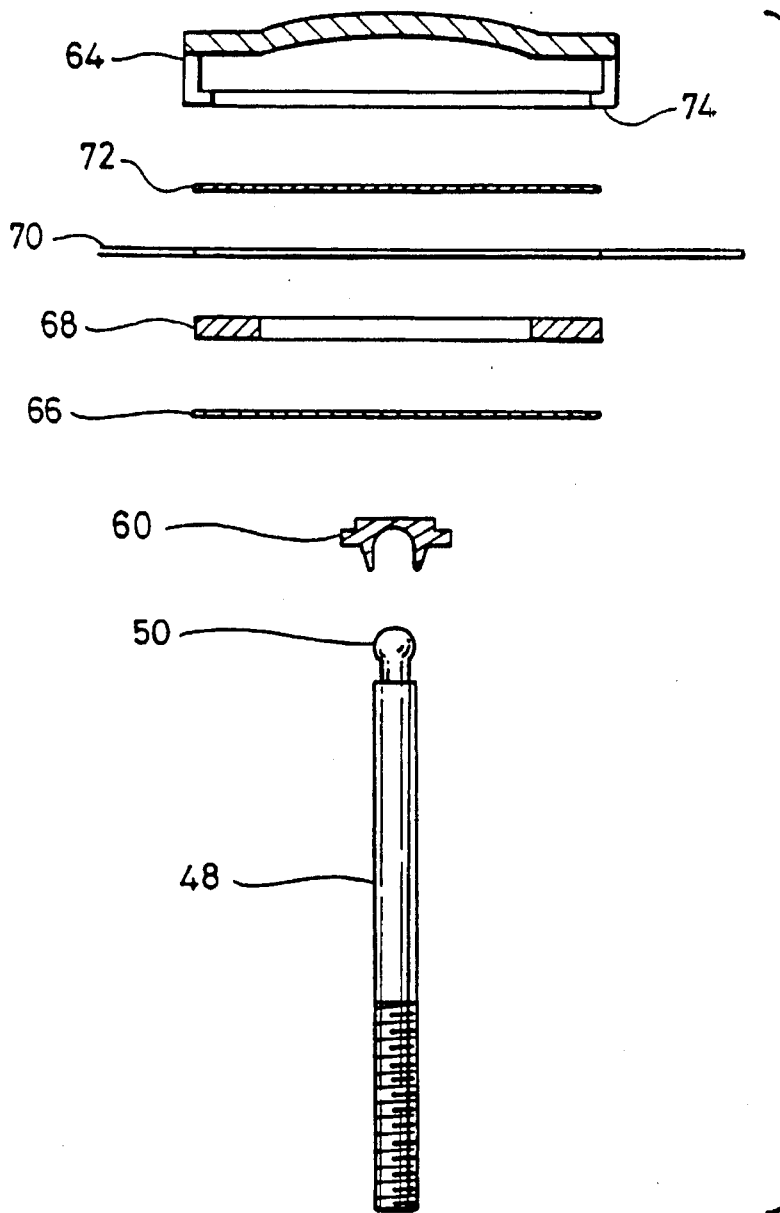
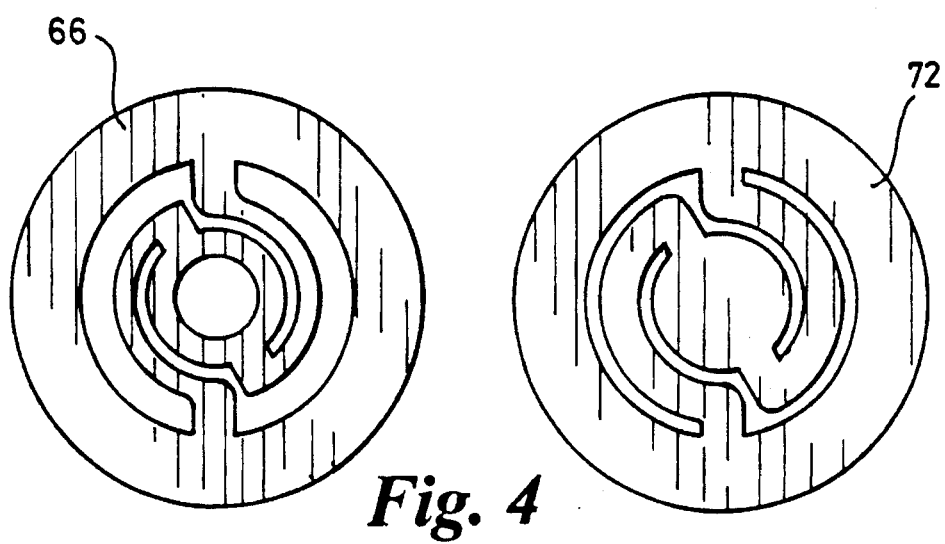
Fig. 3
Fig. 4

SOLENOID ACTUATOR

The present application relates to solenoid actuators, and more particularly to solenoid actuators used for fluid flow control.

Solenoid actuators of the type in question are well known in fluid flow control, where an orifice or aperture in a fluid flow path is to be opened or closed by means of a closure member such as a seal, plug, or the like, under the control of an electric current.

Such actuators commonly comprise a magnetic circuit wound about by a flux-generating coil, with a plunger of magnetic material moving under the influence of the flux in the magnetic circuit, in response to current flow through the coil. The plunger is mechanically coupled to the closure means which opens or closes the aperture or orifice in the fluid flow path as the plunger moves within the magnetic circuit.

Such actuators frequently incorporate a coil spring, normally wound about the plunger, to provide an axial force, along the principal axis of the plunger, additional to that which would be exerted upon the plunger by the solenoid alone, to assist opening of the aperture or orifice. To provide sufficient force for the purpose, the coil spring may have to be relatively long, thereby increasing the overall axial dimension of the actuator, and will require the generation of electromagnetic force by the coil during the closure stroke, additional to that necessary to move the plunger, solely for the purpose of overcoming the force due to the coil spring.

Known actuators of the type in question have hitherto most usually been constructed as an integral part of the fluid flow systems in which they have been employed, and have often been indirectly acting, thereby giving rise to assemblies of considerable complexity.

Where such actuators have been of discrete construction, they have commonly been of a size preventing their employment within a compact enclosed assembly, such as a gas meter.

It is often a further requirement of such actuators to be able to electrically signal the status of the related fluid flow valve, whether open or closed.

It is one object of the present invention to provide an improved solenoid actuator for use in fluid flow control applications in which the disadvantages of such prior art actuators are substantially reduced, and in which electrical status indication is readily achieved.

According to one aspect of the invention a solenoid actuator comprises a closure member adapted to engage a fluid flow aperture to the solenoid actuator;

solenoid means having a moving plunger adapted to move the closure member into engagement with the fluid flow aperture;

the closure member comprising a sealing surface to contact the fluid flow aperture and a diaphragm spring, within the closure member, to which the plunger is attached;

the diaphragm spring being adapted to deform in the direction of travel of the solenoid plunger when the sealing surface has contacted the fluid flow aperture, to convey to the sealing surface, and to limit, the force exerted upon the sealing surface by the solenoid means, and to provide a force acting to displace the closure member from the fluid flow aperture when the force due to the solenoid means is removed.

The diaphragm spring preferably bears upon the underside of the sealing surface directly below that part of the sealing surface which contacts and seals the fluid fluid aperture.

The solenoid means may include a permanent magnet the flux from which maintains the plunger stably at one end of its travel, which may be the end at which the aperture is closed.

The translation of the plunger to or from the stable state may be by means of a magnetic pulse.

The solenoid actuator may incorporate a switch indicating whether the aperture or orifice is open or closed, which may be a membrane switch incorporated in the assembly comprising the diaphragm spring or springs, or may be a magnetically operated reed switch, mounted in or in proximity to the magnetic circuit of the solenoid means and responsive to the flux therein.

A solenoid actuator in accordance with the invention has the principal advantage of providing a more compact and energy-efficient construction, arising from a combination of the saving of axial length due to the use of a diaphragm spring in place of the more usual axial coil spring, and of the saving of coil ampere-turns, due to obviation of the need to provide electro-magnetic force during plunger closure travel, to overcome the countering force exerted by the coil spring.

In accordance with a further aspect, the invention provides a gas meter having a gas-tight casing; a gas inlet line to the gas meter, the gas inlet line having an aperture within the gas-tight casing, to permit the flow of gas from the inlet line into the gas-tight casing; and a solenoid actuator mounted within the gas-tight casing to control the flow of gas through the aperture into the gas-tight casing.

The solenoid actuator employed within the gas meter is preferably a solenoid actuator in accordance with the present invention.

The invention will be described by way of example only with particular reference to the accompanying drawings which show solenoid actuators for use in gas flow control, and in which:

FIG. 3 shows an exploded view of the plunger and orifice closure assembly of the solenoid actuator of FIG. 2;

FIG. 4 shows the plan view of two of the component parts of the assembly of FIG. 3;

Figure 1:
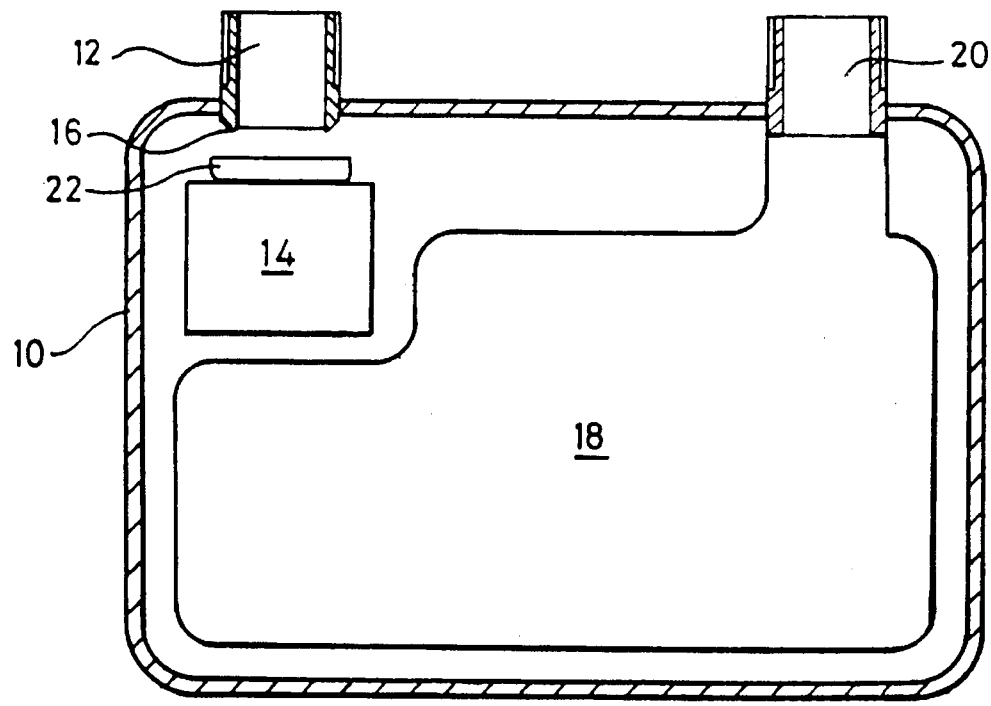
FIG. 1 is a diagrammatic representation of a gas metering assembly employing a solenoid actuator in accordance with the invention.

Referring to FIG. 1, a gas meter comprises a gas tight casing 10, an inlet port 12, sealed into the casing 10, a solenoid actuator 14, mounted, on a suitable bracket, (not shown) adjacent the inner orifice 16 of inlet port 12. A metering system, shown generally as 18, receives gas incoming from the inlet port 12, and delivers it to an outlet port 20 sealed into the casing 10, and to the exit of the metering system 18.

Actuator 14 has a compliant closure member 22 which may engage orifice 16, under the control of actuator 14, to prevent ingress of gas to the meter case 10, and metering system 18.

Actuator 14 may itself be powered from a battery inside or outside the meter casing 10, under the control of circuitry triggered by locally or remotely generated signals e.g. telemetric control signals transmitted from a remote location, or signals from the metering system, or an associated pre-payment card reader system; indicative of one or more of a number of conditions, to open or close the orifice 16.

With closure member 22 in the position shown, gas is able to enter meter casing 10, pass into the metering system 18 and exit through outlet port 20 to appliances coupled to the external gas circuit being supplied from outlet port 20.

Figure 2:
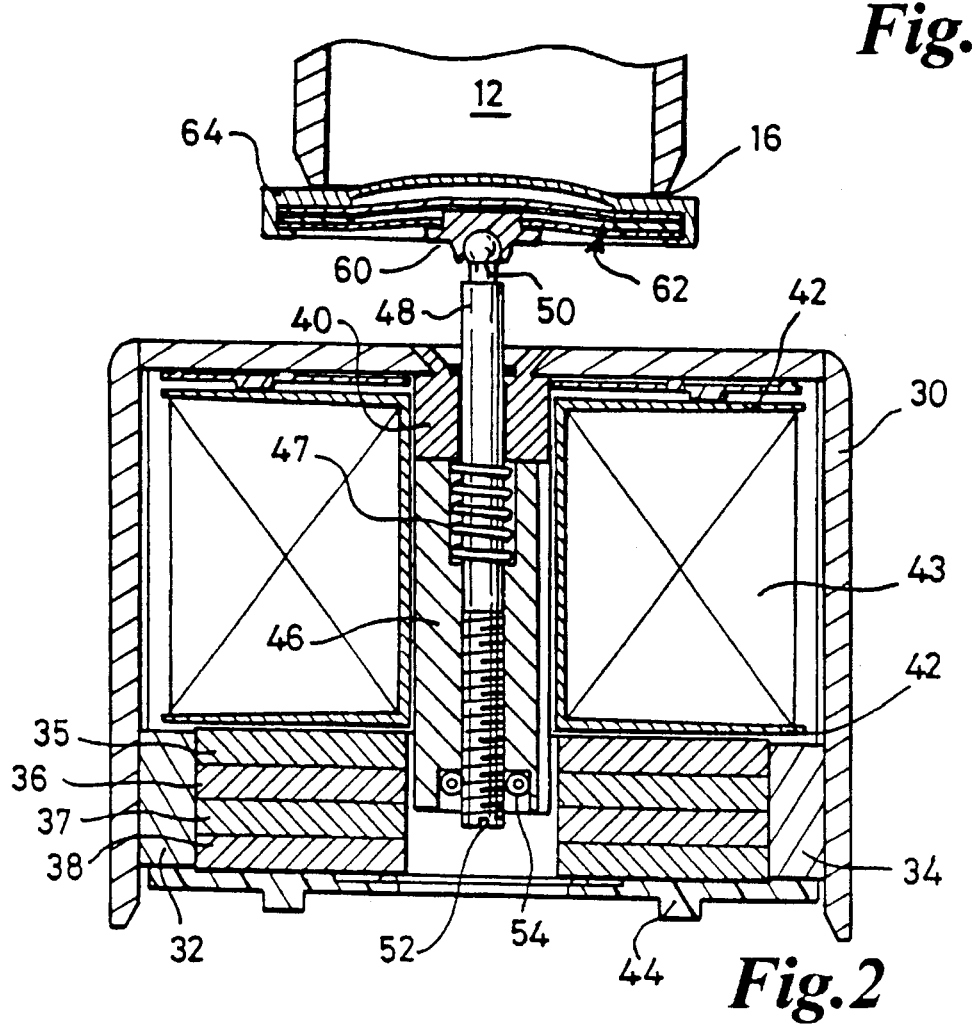
FIG. 2 shows a cross-section of a solenoid actuator for use in closing and opening the inlet orifice of a gas metering assembly such as represented in FIG. 1.

Referring to FIGS. 2 and 3, the solenoid actuator 14 comprises a U-shaped frame 30 of magnetic steel strip, into which are fitted permanent magnets 32 and 34, and laminated magnetic strip pole pieces 35, 36, 37, and 38, the assembly forming a closed magnetic circuit. A cylindrical stop 40, also of magnetic material, is attached centrally and below a mating hole in the top face of frame 30.

Mounted within frame 30 is a plastic moulded bobbin 42, about which is wound a coil 43 of insulated copper wire, and into the central aperture of which may be fitted a thin walled brass tube (not shown), finished with a low friction internal coating, in which the solenoid plunger may slide. At its lower end the brass tube will project out of bobbin 42 and fits closely into a central aperture in the stacked pole pieces. A moulded electrically insulating base block 44 mounts the principal components of the solenoid actuator and holds them tightly together for maximum magnetic efficiency.

A cylindrical magnetic steel plunger 46, with a low friction coated outer surface, is a sliding fit within the inner brass tube, and carries a push-rod 48, threaded at its lower end, of non-magnetic material which extends through a corresponding bore in plunger 46. At its upper end push-rod 46 has a ball end 50, and at its lower end, a cross slot 52. The lower, threaded, end of push rod 48 passes through and is tightly engaged in an "O" ring 54, effectively constraining the axial position of push rod 48 within and relative to plunger 46.

Ball end 50 of push rod 48 engages as a floating fit in the socket of bush 60, which mounts the assembly 62, and the moulded domed orifice closure member 64, to push rod 48 and hence plunger 46.

The assembly 62 consists of lower diaphragm spring 66, annular washer 68, membrane switch 70, and upper diaphragm spring 72.

The lower diaphragm spring 66 is made from flexible steel strip, configured to give a precise short stroke/force characteristic, well within its elastic limit.

The annular washer 68, fabricated of plastic or a light metal such as aluminium, allows upward overtravel of the lower diaphragm spring 66 at least partly therethrough, and is of a rigidity and flatness to engage the periphery of the underside of closure member 64, to establish sealing closure between the upper face of the closure member 64 and the inlet orifice 16, when the actuator is operated.

Membrane switch 70 is a suitably configured switch element, connected by flexible tails (not shown) to an external circuit, and arranged to close under the pressure exerted against it by the lower diaphragm spring 66 when the solenoid actuator closes the inlet orifice 16.

The upper diaphragm spring 72, also fabricated of flexible spring steel but configured to have a stiffer spring rate than the diaphragm spring 66, provides a backing for membrane switch 70, to ensure positive switch closure at the end of upward plunger travel, when the closure member 64 has engaged and sealed the orifice 16.

The moulded closure member 64, typically of gas-approved nitrile rubber or similarly approved compliant material, holds the assembly 62 within its interior, as shown, by means of the lip 74.

Suitable leads (not shown) are provided to connect the solenoid coil to a direct current power source, such as a battery, via a switching circuit by means of which the operation of the actuator to permit or prevent gas flow through the related aperture or orifice is controlled.

As illustrated in FIG. 2, the solenoid actuator is shown with the plunger 46, in the upper stable position, with plunger 46 engaged upon the lower face of stop 40, holding closure member 64 engaged against orifice 16.

Operation of the solenoid actuator to close the inlet orifice 16, from an open position such as shown in FIG. 1, is as follows.

With the inlet orifice 16 open, and the underside of the closure member 64 resting on the top of frame 30 of the actuator, application of a positive-going current pulse of pre-determined duration to solenoid coil 43, produces a magnetic flux adding to the quiescent flux in the magnetic circuit due to the permanent magnets 32 and 34, causing the plunger 46 to be attracted upwardly toward stop 40, and closure member 64 to be moved upwards upon push-rod 48, towards inlet orifice 16.

When closure member 64 engages orifice 16, further upward movement of plunger 46 deflects the inner part of diaphragm spring 66 through annular washer 68, to engage membrane switch 70 which is in turn deflected upwardly and engages and deflects upwardly the inner portion of diaphragm spring 72, until plunger 46 reaches stop 40 and upward movement of plunger 46 and push rod 48 ceases. At this point plunger 46, is held against stop 40 by the magnetic flux generated by permanent magnets 32 and 34, and there is no current flow through coil 43.

The positioning of push-rod 48 within plunger 46, and the mounting of the solenoid actuator relative to inlet orifice 16, determines the stroke distance of the closure member from rest (to close the orifice 16) and the over-travel distance (for deflection of the diaphragm springs 66 and 72).

Precise adjustment of the total travel (stroke distance plus over-travel) of the push-rod 48 relative to the orifice 16, is achieved by axial adjustment of the position of push-rod 48 within plunger 46, using a screwdriver to engage cross slot 52 and screw push rod 48 into or out of plunger 46 until the requisite position is achieved.

Diaphragm springs 66 and 72 are symmetrically configured to provide on-axis forces without undesirable sideways deflection, and designed to have a combined downwardly acting force, when engaged, some 50% less than the upwardly acting force upon plunger 46 due to the permanent magnets 32,34, in order to prevent inadvertent downward displacement of plunger 46 and closure member 64, due to vibration, shock or other applied mechanical forces, or due to unexpected gas pressure rises in inlet port 12.

The orifice 16 may subsequently be opened by the application of a negative-going current pulse of predetermined duration to coil 43 to generate a downward force upon plunger 46, which when added to the downward force exerted by the diaphragm springs 66 and 72, exceeds the holding force due to permanent magnets 32 and 34, releasing plunger 46 from stop 40. The downward movement of plunger 46 to its lower stable rest position, removes the closure member 64 from the orifice 16.

The opening of orifice 16 will also be assisted by gas pressure in inlet port 12.

The opening of the aperture will be further assisted by the small optional axial coil spring 47, when present, which surrounds push rod 48 within a counter-bore in plunger 46, and provides a degree of buffering between plunger 46 and stop 40, during the valve closure stroke.

It will be appreciated that a further advantage of the use of a diaphragm spring or springs in the actuator in place of an axial coil spring, is that when the aperture or orifice is closed, the diaphragm spring periphery, acting upon the closure member, provides a conformal force about the rim of the orifice 16 in addition to that due to the material of the closure member 64. Also that by providing the force assisting valve opening by means of a diaphragm spring or springs, which have an inherently short stroke, the plunger 46 is free to accelerate upwards during the closure stroke without check until almost the end of its stroke, permitting a speedier closure operation with a smaller electromagnetic force than would be possible when acting against an elongated axial coil spring of providing equivalent force.

An alternative to the membrane status indicating switch arrangement may be provided for a solenoid valve actuator assembly in accordance with the invention, where the use of a membrane switch may be inappropriate.

For example, a sealed, magnetically-operated reed switch may be mounted in, or adjacent, the magnetic circuit of the solenoid actuator and be operated by magnetic flux conditions in the magnetic circuit corresponding with the "valve closed" and "valve open" states of the solenoid actuator.

Figure 5:
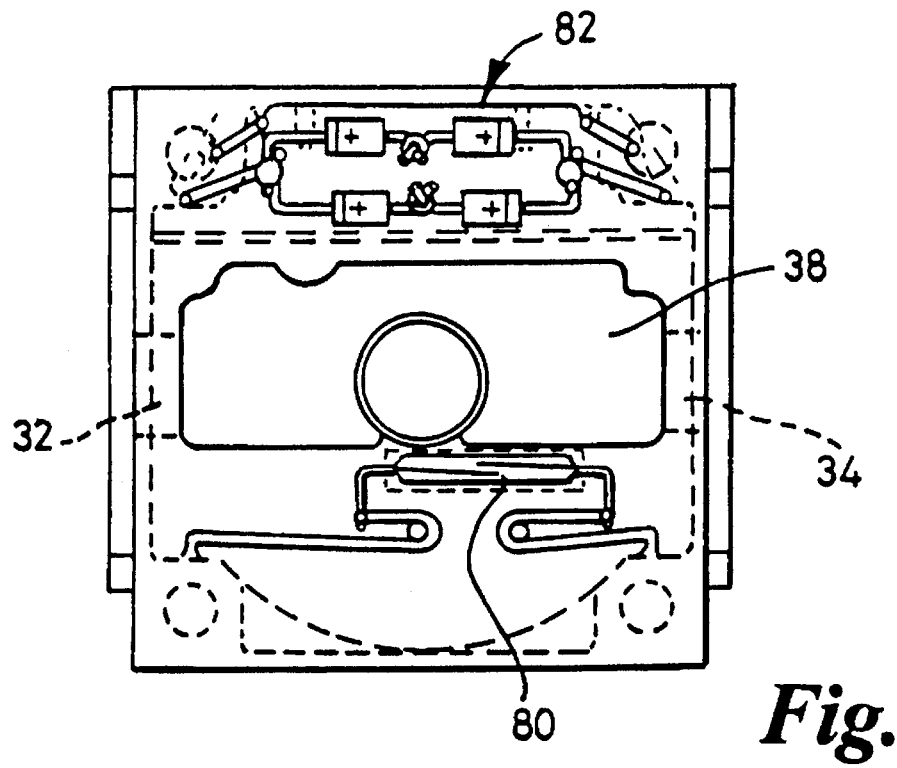
FIGS. 5 and 6 illustrate a modified solenoid actuator in accordance with the invention.
Figure 6:
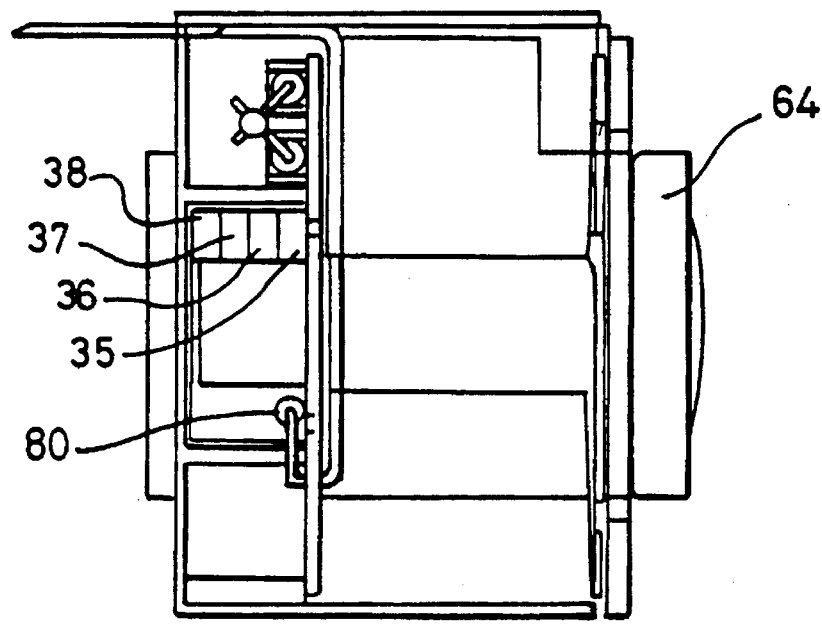
Figure 7:
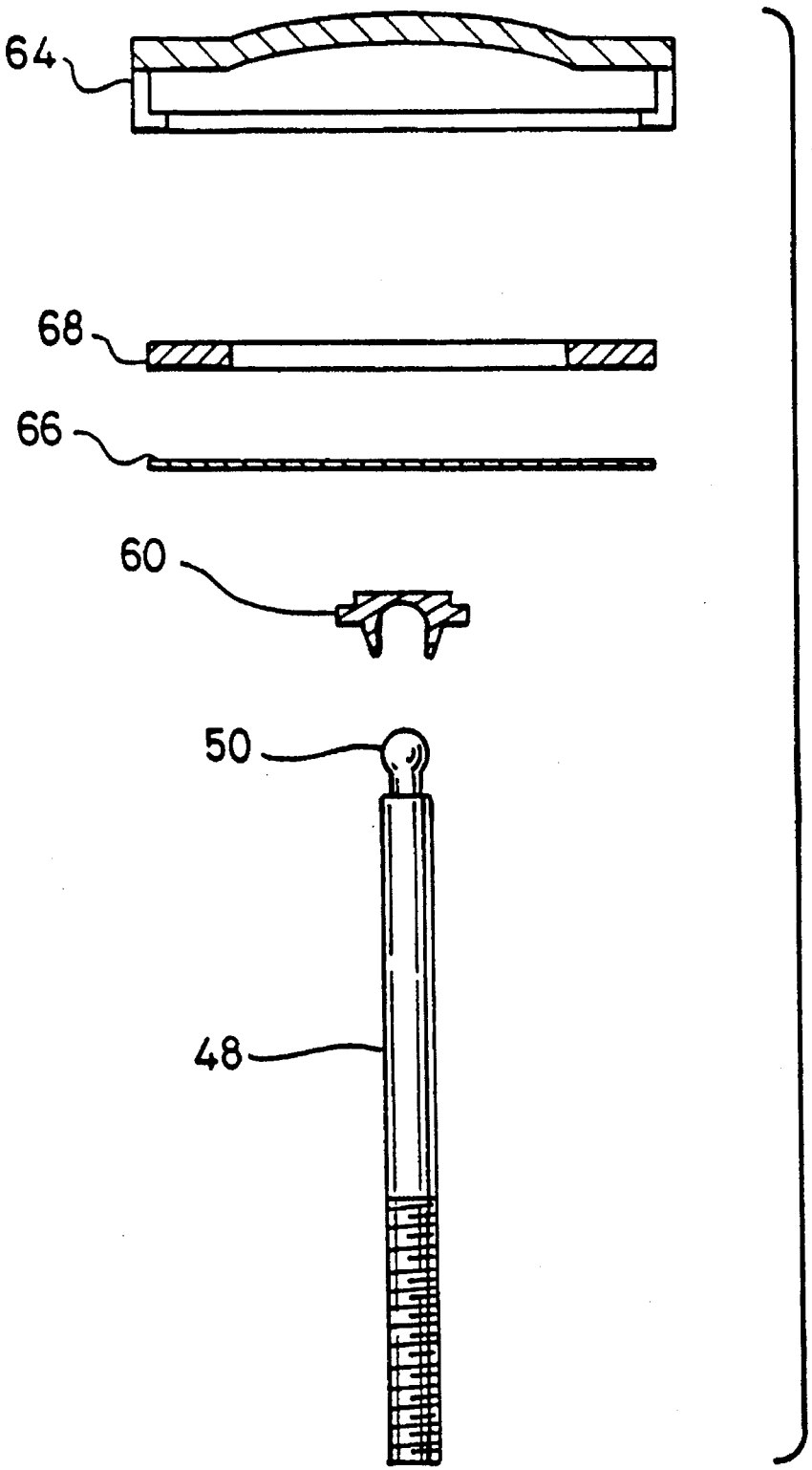
FIG. 7 shows the exploded view of the plunger and orifice closure assembly employed with the actuator described with reference to FIGS. 5 and 6.

FIGS. 5 and 6, show the underside and side views respectively of a solenoid actuator in accordance with the invention, generally similar to the actuator described with reference to FIGS. 1 to 4, with the exception of the type of status switch employed and the simpler form of shut-off assembly, illustrated in FIG. 7.

An encapsulated reed switch 80 is disposed laterally and off-centre with in and with respect to a cut-out in the pole pieces 35 to 38, in the vicinity of the lower end of the plunger tube 44, and aligned with the flux path in the pole pieces as a whole.

When the plunger 46 is in the lower position, corresponding to the open position of the valve, reed switch 80 is open. When the actuator is energised and the plunger 46 drawn upwardly to stop 40, reed switch 80 will close, due to the re-disposition of a proportion of the magnetic flux within the pole pieces through reed switch 80.

Provision of an electrical switch of either type, operating upon closure of the valve, enables the switch, in association with appropriate circuitry, to give local or remote indication of the status of the valve and to control or condition the power supply circuits of the valve.

For example, in the present embodiment closure of the status switch, enables a visual indication of valve state to be given on a display, either local or remote, outside the gas meter casing. Alternatively, or additionally, operation of the switch could be used to discontinue the supply of current drive to the coal, immediately upon closure, rather than by use of a pulse of fixed predetermined duration, potentially saving drive battery energy, the flux from the permanent magnets then holding the valve closed until the application of a reverse current pulse to overcome the permanent magnet holding flux to open the valve.

Various modifications of the invention may be made to the actuator without exceeding the scope of the invention.

For example various kinds and configurations of closure member may be adopted complementary to the fluid flow orifice or aperture to be closed. Similarly the closure member may be drawn down onto or into the orifice or aperture by suitable modification of the closure member geometry and of the solenoid actuator.

One or more diaphragm springs may be employed between the plunger and the closure member, appropriate to the detailed design requirements of the actuator and its application. Although the invention is most appropriately applicable to a direct acting actuator, with a permanent magnet hold, the invention is not to be regarded as so limited.

Similarly the diaphragm spring or springs may be mounted other than within the orifice closure member as shown in the embodiment described with reference to the accompanying drawings.

Use of the reed switch variant of the solenoid actuator described with reference to FIGS. 5 and 6, is particularly appropriate when an intrinsically safe, sealed, status signalling switch is required.

A further intrinsic safety feature is provided in the same embodiment by the provision of a duplicate back-to-back network of zener diodes, such as is generally indicated at 82, to prevent the back-emf from the actuator coil winding rising above a safe level at any time during operation.

Although described as driven by current pulses of opposed polarity applied to a common winding, the actuator could also be provided with two counterwound windings, enabling pulses of the same polarity to be used for operation of the actuator in either direction.

In one example of a solenoid actuator in accordance with the invention, designed for incorporation within a domestic gas meter, the stroke of the valve is a nominal 7.00 mm, with an overtravel 1.00 mm, with a minimum sealing force of 500 gF, to seal gas at 22 mBar nominal pressure.

The sealing force is achieved as the resultant of a force at closure of some 1500 gF due to the permanent magnets of the solenoid, offset by the restoring force due to the displaced diaphragm springs of some 1000 gF.

The actuator has dimensions of 50 mm by 54 mm plan, and a height of 42 mm.

The actuator is operated in each direction by means of an operating pulse of 100 mSec, at an operating voltage of 1.9 volts, clipped to a 4.0 volts peak by a back-to-back zener diode network. The typical pulse energy needed for actuation is 3 mJoules. The energy consumption required by the actuator, for one particular duty for a specified period of operation, is some 50 mA hours, drawn from a battery of 20 A hours overall capacity, already present within the gas meter to operate metering and control circuits.

Although the solenoid actuators are herein described as discrete components operating in association with apertures or orifices in separate associated equipment, the actuators may conveniently be provided with and mounted upon a combined bracket and fluid flow aperture, adapted for connection into associated pipework or the like. Such an arrangement simplifies the adjustment of stroke and overtravel setting of the actuator relative to the aperture or orifice.

I claim:

1. Solenoid actuator for a fluid flow valve, the solenoid actuator comprising:

a closure member adapted to engage a fluid flow aperture external to the solenoid actuator;

solenoid means having a movable plunger adapted to move the closure member into engagement with the fluid flow aperture;

the closure member comprising a sealing surface to contact the fluid flow aperture and a diaphragm spring, within the closure member, to which the plunger is attached;

the diaphragm spring being adapted to deform in the direction of travel of the solenoid plunger when the sealing surface has contacted the fluid flow aperture, to convey to the sealing surface, and to limit, the force exerted upon the sealing surface by the solenoid means, and to provide a force acting to displace the closure member from the fluid flow aperture when the force due to the solenoid means is removed.

2. A solenoid actuator in accordance with claim 1 in which the periphery of the diaphragm spring bears upon the underside of the sealing surface directly below that part of the sealing surface which contacts and seals the fluid flow aperture.

3. A solenoid actuator in accordance with claim 1 including a switch, the operative state of which indicates the position of the closure member relative to the fluid flow aperture.

4. A solenoid actuator in accordance with claim 3 in which the switch is a membrane switch incorporated within the closure member.

5. A solenoid actuator in accordance with claim 3 in which the switch is a magnetically operated reed switch mounted in or in proximity to the magnetic circuit of the solenoid means and responsive to the magnetic flux therein.

6. A solenoid actuator in accordance with claim 1 in which the magnetic circuit of the solenoid means includes a permanent magnet, and in which the plunger is held stably with the closure member in engagement with the fluid flow aperture, by means of the magnetic flux due to the permanent magnet.

7. A solenoid actuator in accordance with claim 6 in which the plunger is moved to or from the stable state in which it is held by the permanent magnet, by means of a pulse of magnetic force.

8. A gas meter having a gas-tight casing; a gas inlet line to the gas meter, the gas inlet line having an aperture within the gas-tight casing, to permit the flow of gas from the inlet line to the gas-tight casing; and a solenoid actuator mounted in its entirety within a region of the gas-tight casing through which the flow of gas passes, to control the flow of gas through the aperture into the gas tight casing.

9. A gas meter having a gas-tight casing; a gas inlet line to the gas meter, the gas inlet line having an aperture within the gas-tight casing, to permit the flow of gas from the inlet line into the gas-tight casing; and a solenoid actuator mounted within the gas-tight casing, to control the flow of gas through the aperture into the gas-tight casing; and in which the solenoid actuator comprises a closure member adapted to engage the aperture; and solenoid means having a movable plunger adapted to move the closure member into engagement with the aperture; the closure member comprising a sealing surface to contact the aperture and a diaphragm spring, within the closure member, to which the plunger is attached; the diaphragm spring being adapted to deform in the direction of travel of the solenoid plunger when the sealing surface has contacted the aperture; to convey to the sealing surface, and to limit, the force exerted upon the sealing surface by the solenoid means, and to provide a force acting to displace the closure member from the fluid flow aperture when the force due to the solenoid means is removed.

* * * * *